(12) United States Patent
Trojanowski et al.

(10) Patent No.: US 8,707,906 B1
(45) Date of Patent: Apr. 29, 2014

(54) ELEVATED ANIMAL PERCH ASSEMBLY

(76) Inventors: Henry Trojanowski, Cochranville, PA (US); Tammy Obert, Cochranville, PA (US)

( * ) Notice: Subject to any disclaimer, the term of this patent is extended or adjusted under 35 U.S.C. 154(b) by 388 days.

(21) Appl. No.: 13/155,025

(22) Filed: Jun. 7, 2011

(51) Int. Cl.
*A01K 15/02* (2006.01)
(52) U.S. Cl.
USPC .......................... 119/706; 119/28.5; 119/537
(58) Field of Classification Search
USPC ........ 119/28.5, 537, 468, 467, 531, 705, 706;
108/47, 149; 248/317, 338, 340;
182/10, 27, 36; 211/117, 118, 85.29;
482/23, 24, 33–36, 38–39, 148
IPC .............................................. A01K 29/00,15/02
See application file for complete search history.

(56) References Cited

U.S. PATENT DOCUMENTS

| | | | | |
|---|---|---|---|---|
| 2,579,797 | A * | 12/1951 | Churchfield et al. ........ | 119/28.5 |
| 3,479,991 | A | 11/1969 | Lichtenberger | |
| 3,595,209 | A | 7/1971 | Parker | |
| D222,276 | S | 10/1971 | Hughes, Jr. | |
| 3,857,365 | A * | 12/1974 | Mueller ........................ | 119/28.5 |
| 4,061,092 | A * | 12/1977 | Jacobsen et al. .............. | 108/149 |
| 4,497,279 | A * | 2/1985 | Bell ............................... | 119/706 |
| 5,002,012 | A | 3/1991 | Pierrot | |
| 5,275,128 | A | 1/1994 | Barnes | |
| 5,413,068 | A * | 5/1995 | Segal ............................. | 119/537 |
| D365,016 | S * | 12/1995 | Hollinger ...................... | D8/381 |
| 5,474,025 | A * | 12/1995 | Lee ................................ | 119/464 |
| 5,809,933 | A | 9/1998 | Conwell, III | |
| 5,829,390 | A | 11/1998 | Jonilla et al. | |
| 5,913,750 | A * | 6/1999 | Smithback ..................... | 482/54 |
| 5,975,735 | A | 11/1999 | Schmitt | |
| 6,224,029 | B1 * | 5/2001 | Marble et al. ................. | 248/214 |
| 6,431,120 | B1 | 8/2002 | Feldman | |
| 7,614,363 | B2 * | 11/2009 | Di Angelo et al. ........... | 119/28.5 |
| 7,934,470 | B1 * | 5/2011 | Barker ........................... | 119/28.5 |
| 2008/0149042 | A1 | 6/2008 | Halpern | |
| 2012/0021874 | A1 * | 1/2012 | Liggett .......................... | 482/36 |

FOREIGN PATENT DOCUMENTS

JP         2009189265 A   *   8/2009

* cited by examiner

*Primary Examiner* — Shadi Baniani

(57) ABSTRACT

An elevated animal perch assembly provides a perch for an animal permitting play or relaxation in an elevated position away from other animals and an alternative to perching on existing furniture. The assembly includes at least one track section having a pair of spaced rails and a plurality of spaced cross members coupled to and extending across the rails. A plurality of chains each has a lower end coupled to the track section. Each chain has an upper end configured for coupling to a ceiling. A top bracket is also provided having a first flange coupled to the track section and a second flange configured for coupling to a wall for bracing the track section relative to the wall.

1 Claim, 5 Drawing Sheets

ELEVATED ANIMAL PERCH ASSEMBLY

BACKGROUND OF THE DISCLOSURE

1. Field of the Disclosure

The disclosure relates to animal perch devices and more particularly pertains to a new animal perch device for providing a perch for an animal to permit play or relaxation in an elevated position away from other animals and as an alternative to perching on existing furniture.

2. Summary of the Disclosure

An embodiment of the disclosure meets the needs presented above by generally comprising at least one track section having a pair of spaced rails and a plurality of spaced cross members coupled to and extending across the rails. A plurality of chains each has a lower end coupled to the track section. Each chain has an upper end configured for coupling to a ceiling. A top bracket is also provided having a first flange coupled to the track section and a second flange configured for coupling to a wall for bracing the track section relative to the wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
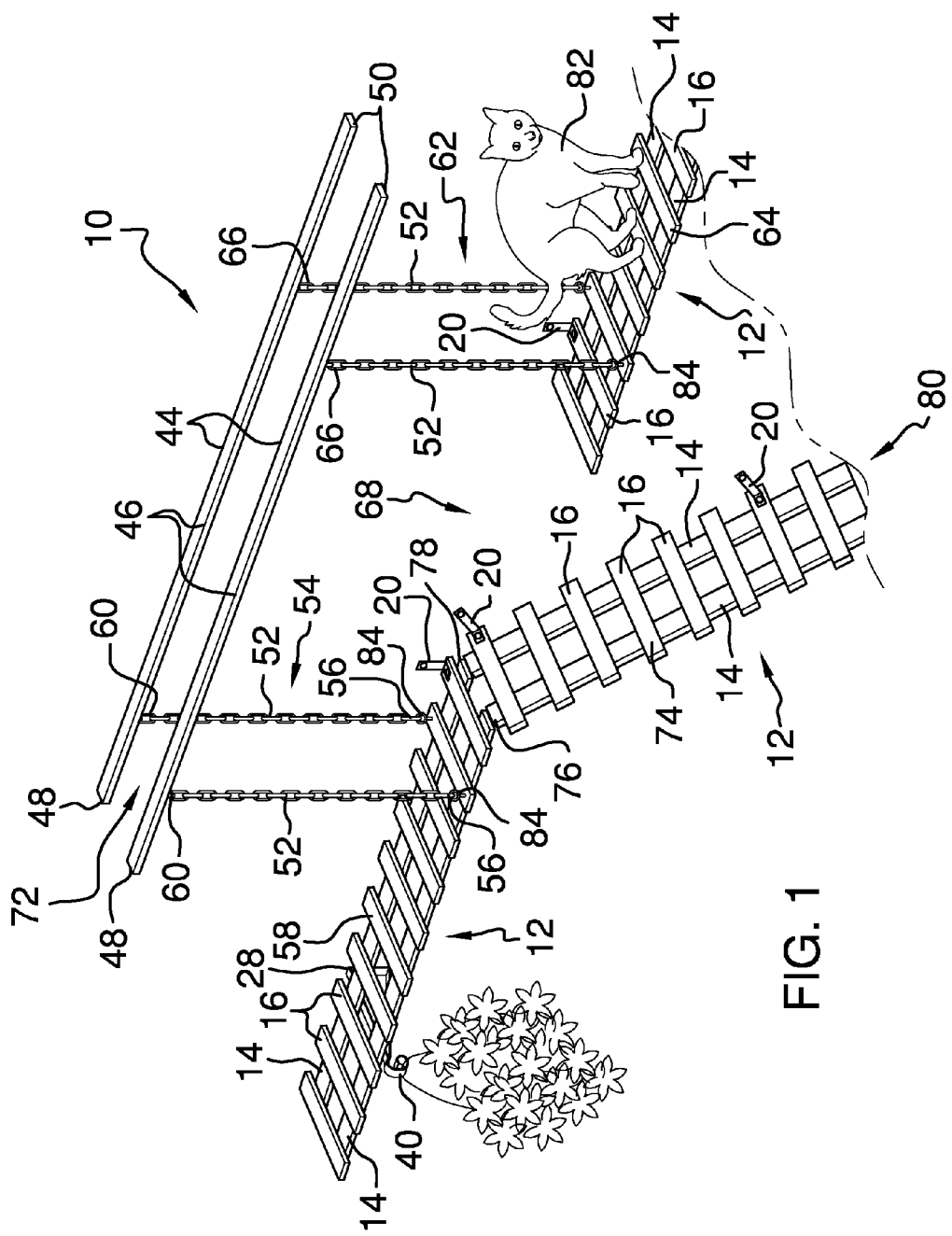
FIG. 1 is a top front side perspective in-use view of a elevated animal perch assembly according to an embodiment of the disclosure.
Figure 2:
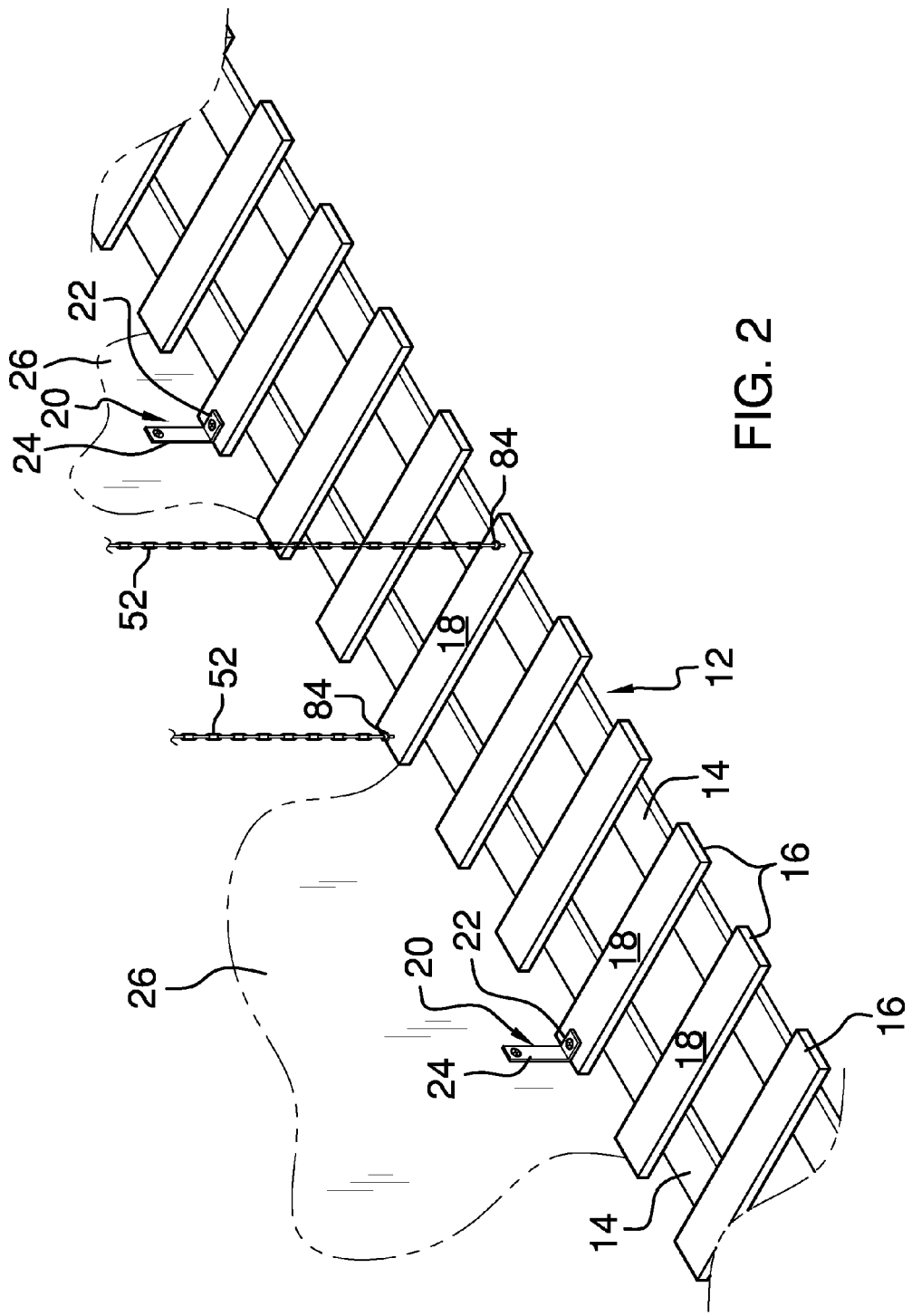
FIG. 2 is a top front side perspective view of an embodiment of the disclosure.
Figure 3:
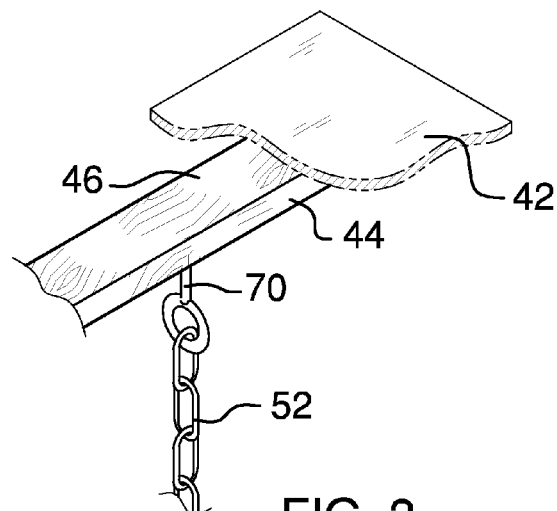
FIG. 3 is a top front side perspective detail view of an embodiment of the disclosure.
Figure 4:
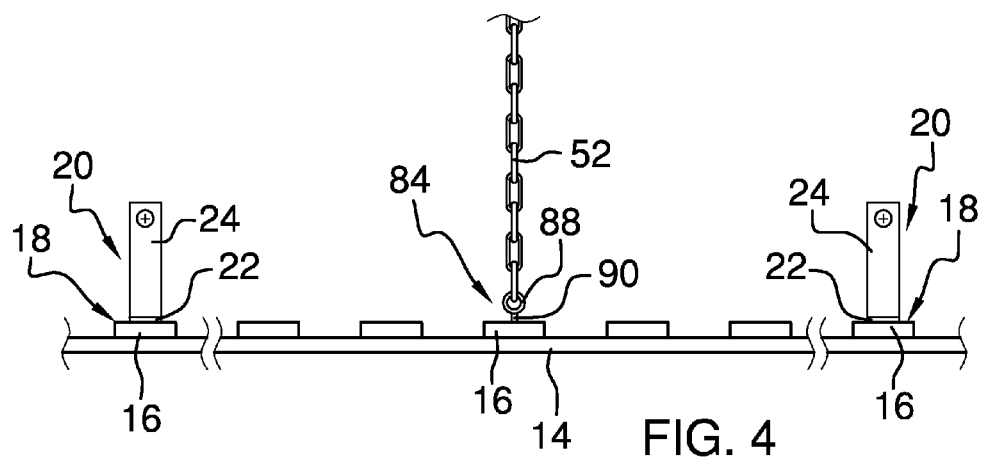
FIG. 4 is a side view of an embodiment of the disclosure.

With reference now to the drawings, and in particular to FIGS. 1 through 7 thereof, a new animal perch device embodying the principles and concepts of an embodiment of the disclosure and generally designated by the reference numeral 10 will be described.

As best illustrated in FIGS. 1 through 7, the elevated animal perch assembly 10 generally comprises a plurality of track sections 12. Each track section 12 has a pair of spaced rails 14 and a plurality of spaced cross members 16. The cross members 16 are coupled to and extend across the rails 14. An upper surface 18 of each of the cross members 16 of each track section 12 is coplanar with each other. A plurality of top brackets 20 is provided. Each top bracket 20 has a first flange 22 coupled to an associated one of the track sections 12 and a second flange 24 configured for coupling to a wall 26 for bracing the associated track section 12 relative to the wall 26.

A bottom bracket 28 has an upper flange 30 extending across the spaced rails 14. The upper flange 30 is coupled to the spaced rails 14. The bottom bracket 28 has a lower flange 32 configured for coupling to the wall 26 for supporting the track section 12. The bottom bracket 28 has a bracing member 34 coupled to and extending between the upper flange 30 and the lower flange 32. A lower hook 36 is coupled to and extends from the lower flange 32 of the bottom bracket 28. The lower hook 36 extends from a position adjacent the wall 26 and curves upwardly and back towards the wall 26 terminating in a free end 38. An upper hook 40 is coupled to and extends from a distal end 44 of the upper flange 30 of the bottom bracket 28 relative to the lower flange 32 of the bottom bracket 28. The upper hook 40 or lower hook 36 may be employed to hang plants or secure other decorative items to the bottom bracket 28. This provides enhanced decorative or storage capability on the wall 26 proximate a ceiling 42.

A pair of ceiling supports 44 may also be provided. Each ceiling support 44 has an upper surface 46 configured for abutting against the ceiling 42. The ceiling supports 44 may be positioned parallel to each other. Each ceiling support 44 has a first end 48 and a second end 50. The first ends 48 of the ceiling supports 44 are aligned with respect to each other. Similarly, the second ends 50 of the ceiling supports 44 may also be aligned with each other. A plurality of chains 52 may be used to support the track sections 12. Each of the chains 52 of a first pair 54 has a lower end 56 coupled to a first one 58 of the track sections 12. Each of the first pair 54 of chains 52 also has an upper end 60 coupled to an associated one of the ceiling supports 44. Each of a second pair 62 of the chains 52 has a lower end 64 coupled to a second one 64 of the track sections 12. Each of the second pair 62 of chains 52 has an upper end 66 coupled to an associated one of the ceiling supports 44. The first one 58 of the track sections 12 is positioned in spaced relationship to the second one 64 of the track sections 12 forming a gap 68 between the first track section 58 and the second track section 64. The first track section 58 and the second track section 64 may be coplanar or parallel.

A connection member 70 in the form of an eye hook or other similar connector may be coupled directly to the ceiling support 44. An upper end 72 of at least one chain 52 may be coupled to the connection member 70. The connection member 70 may be one of several used such that each chain 52 is singly coupled to each connection member 70 or multiple chains 52 may be coupled to the same connection member 70 as may be desired.

A third one 74 of the track sections 12 may have an upper end 76 positioned adjacent to a first end 78 of the first track section 58. The third track section 74 extends down and away from the first end 78 of the first track section 58. Thus, the third track section 74 forms a ramp 80 configured for assisting an animal 82 to climb up to the first track section 58. The first end 78 of the first track section 58 may be positioned adjacent to the gap 68 to provide a more compact width to the perch assembly 10.

Figure 5:
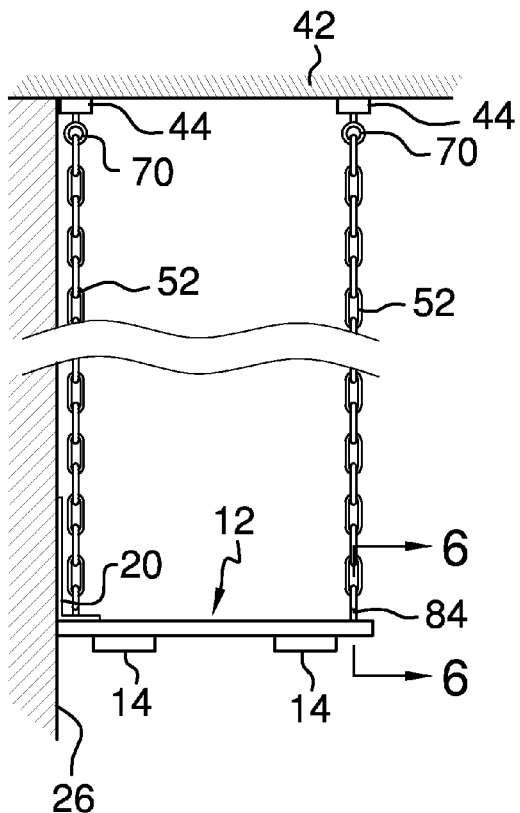
FIG. 5 is an end view of an embodiment of the disclosure.
Figure 6:
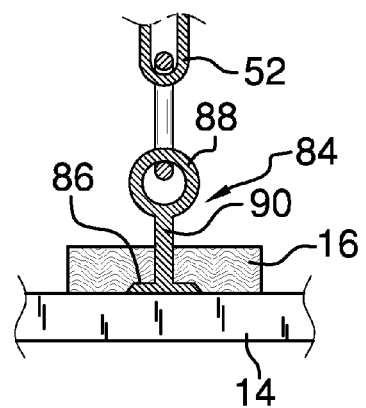
FIG. 6 is a cross-sectional view of an embodiment of the disclosure taken along line 6-6 of FIG. 5.
Figure 7:
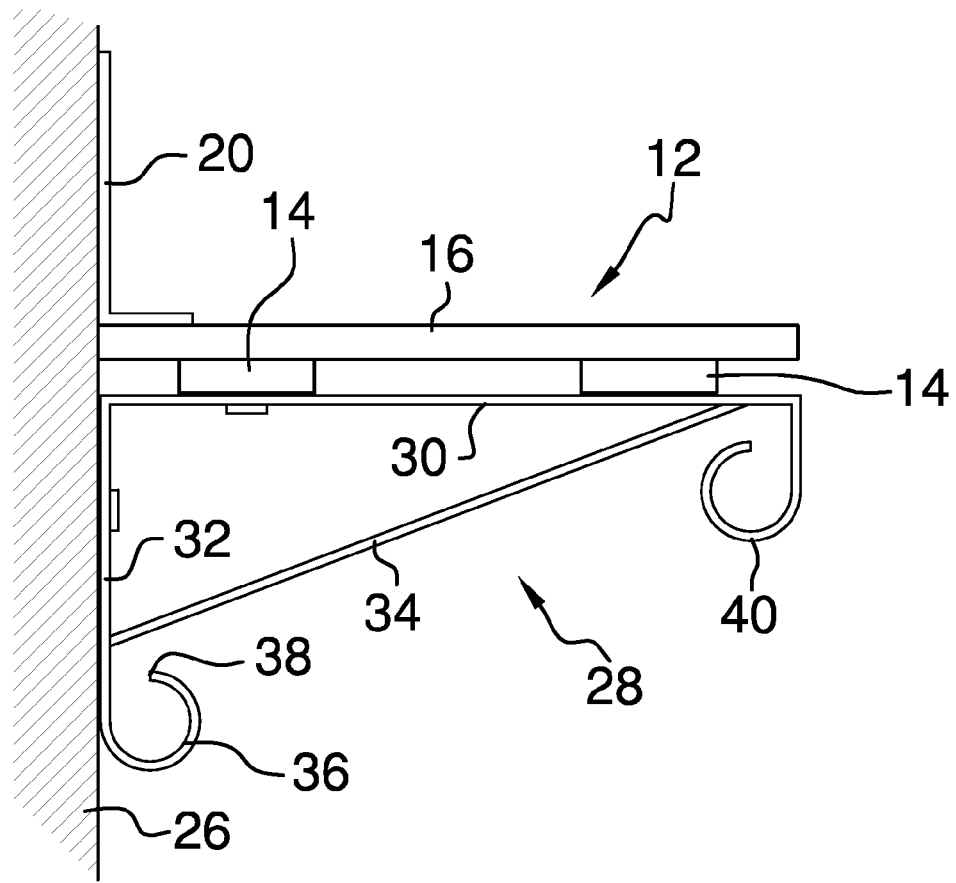
FIG. 7 is an end view of an embodiment of the disclosure.

A plurality of couplers 84 may be utilized to connect the chains 52 to the cross members 16. Each coupler has a base 86, a loop 88, and a post 90 extending between the base 86 and the loop 88. The base 86 may be inset into the cross members 16 and obstruct the post 90 from pulling out of the cross member 16 as shown in FIG. 5.

In use, the track sections 12 are installed by connection to the ceiling 42 and securing to the wall 26 to prevent excessive swaying or movement of the track sections 12. Each track section 12 may be constructed of teak or other wood material. The track sections 12 may be used by the animal 82 to run and jump or to simply lay about suspended above the ground level. The track sections 12 may also provide additional storage when not being used for animal recreation. The elevation of the track sections 12 provides a safe place for rest or play for an animal, particularly a cat, away from children or other pets like dogs.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. An animal perch assembly comprising:

a plurality of track sections, each track section having a pair of spaced rails and a plurality of spaced cross members coupled to and extending across said rails, an upper surface of said cross members of each track section being coplanar with each other;

a plurality of top brackets, each said top bracket having a first flange coupled to an associated one of said track sections and a second flange configured for coupling to a wall for bracing said associated track section relative to the wall;

a bottom bracket having an upper flange extending across said spaced rails, said upper flange being coupled to said spaced rails, said bottom bracket having a lower flange configured for coupling to the wall for supporting said track section, said bottom bracket having a bracing member coupled to and extending between said upper flange and said lower flange;

a lower hook coupled to and extending from said lower flange of said bottom bracket;

an upper hook coupled to and extending from a distal end of said upper flange of said bottom bracket relative to said lower flange of said bottom bracket;

a pair of ceiling supports, each said ceiling supports having an upper surface configured for abutting against the ceiling, said ceiling supports being parallel to each other, each ceiling support having a first end and a second end, said first ends of said ceiling supports being aligned with respect to each other, said second ends of said ceiling supports being aligned with each other;

a plurality of chains, a first pair of said chains each having a lower end coupled to a first one of said track sections, each of said first pair of chains having an upper end coupled to an associated one of said ceiling supports, a second pair of said chains each having a lower end coupled to a second one of said track sections, each of said second pair of chains having an upper end coupled to an associated one of said ceiling supports, said first one of said track sections being positioned in spaced relationship to said second one of said track sections forming a gap between said first one of said track sections and said second one of said track sections, said first one of said track sections and said second one of said track sections being coplanar;

a connection member coupled to said ceiling support, said upper end of at least one said chain being coupled to said connection member; and a third one of said plurality of track sections having an upper end positioned adjacent to a first end of said first one of said track sections, said third one of said track sections extending down and away from said first end of said first one of said track sections whereby said third one of said track sections forms a ramp configured for assisting an animal to climb up to said first one of said track sections, said first end of said first one of said track sections being positioned adjacent to said gap.

* * * * *